(12) United States Patent
Terry et al.

(10) Patent No.: US 6,909,703 B2
(45) Date of Patent: Jun. 21, 2005

(54) METHOD FOR DISTRIBUTION OF WIRELESS TRANSMIT/RECEIVE UNIT (WTRU) CAPABILITY BETWEEN POINT TO POINT AND POINT TO MULTIPOINT SERVICES

(75) Inventors: Stephen E. Terry, Northport, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/729,675

(22) Filed: Dec. 5, 2003

(65) Prior Publication Data

US 2004/0156332 A1 Aug. 12, 2004

Related U.S. Application Data

(60) Provisional application No. 60/446,716, filed on Feb. 11, 2003.

(51) Int. Cl.[7] ................................................ G04Q 7/00
(52) U.S. Cl. ........................ 370/328; 370/338; 370/352; 370/401
(58) Field of Search ................................ 370/328, 329, 370/338, 352, 401; 455/414.1

(56) References Cited

U.S. PATENT DOCUMENTS

| | | | |
|---|---|---|---|
| 6,374,112 B1 * | 4/2002 | Widegren et al. ......... | 455/452.2 |
| 6,701,155 B2 * | 3/2004 | Sarkkinen et al. .......... | 455/515 |
| 2002/0090940 A1 * | 7/2002 | Chen et al. ................. | 455/422 |
| 2003/0207696 A1 * | 11/2003 | Willenegger et al. ....... | 455/522 |
| 2004/0081192 A1 * | 4/2004 | Koulakiotis et al. ........ | 370/432 |
| 2004/0127243 A1 * | 7/2004 | Sarkkinen .................... | 455/511 |
| 2004/0137885 A1 * | 7/2004 | Sarkkinen et al. ....... | 455/414.1 |

\* cited by examiner

*Primary Examiner*—Frank Duong
*Assistant Examiner*—Michael J. Moore, Jr.
(74) *Attorney, Agent, or Firm*—Volpe and Koenig, P.C.

(57) ABSTRACT

Method and apparatus for arranging wireless transmit/receive unit (WTRU) capability distribution between point to point (PtP) and point to multipoint (PtM) services. The method addresses PtP/PtM specific and common capabilities shared between PtM and PtP. The method utilizes procedures and different scenarios to coordinate establishment/release of PtP and PtM services and distribution of WTRU PtP/PtM capabilities within a universal mobile telecommunication system terrestrial radio access network (UTRAN).

24 Claims, 3 Drawing Sheets

METHOD FOR DISTRIBUTION OF WIRELESS TRANSMIT/RECEIVE UNIT (WTRU) CAPABILITY BETWEEN POINT TO POINT AND POINT TO MULTIPOINT SERVICES

CROSS REFERENCE TO RELATED APPLICATION(S)

This application claims priority from U.S. Provisional Application No. 60/446,716 filed on Feb. 11, 2003, which is incorporated by reference as if fully set forth herein.

FIELD OF INVENTION

This invention generally relates to wireless transmit/receive unit (WTRU) capability, and more particularly to a method for distribution of WTRU capability between point to point (PtP) and point to multipoint (PtM) services.

BACKGROUND

It is generally known that WTRU capabilities identify transport and physical processing abilities. Transport capabilities define transport channel attributes such as the number of transmitted bits per frame, the number of different combinations of bits allowed, and other similar parameters. Physical capabilities define the number and types of physical channels including parameters such as allowed spreading factors and other similar parameters.

For PtP services, it is noted that radio bearers (RBs) are controlled by the serving radio network controller (S-RNC). The S-RNC coordinates RB establishment, data transmission, release and maintenance of the quality of service (QoS).

In advance of establishment of PtP RBs, the WTRU signals its capabilities to the S-RNC. Physical resources are determined by the controlling RNC (C-RNC) and, for proper determination of physical resources, the S-RNC then relays the capability information to the C-RNC.

For PtM services, RBs are managed by the C-RNC. Similar to the PtP case, the C-RNC coordinates establishment, transmission, and release of PtM RBs. For proper configuration of PtM transport and physical channels, it is necessary to know the PtM capabilities of the WTRU associated with the PtM service. It is therefore necessary to define procedures that provide this information to the C-RNC.

Since PtP and PtM services can exist simultaneously, it is necessary to coordinate transmission of these services so that WTRU capabilities are used efficiently and not exceeded.

Some WTRUs will not have the capability to receive both PtP and PtM services simultaneously, and other WTRUs will have to distribute capabilities between these service types. It is therefore necessary and desirable to coordinate the assignment of WTRU capabilities between the PtP and PtM services. Additionally, since PtP services are managed by the S-RNC and PtM services are managed by the C-RNC, it is desirable to have procedures in place to coordinate the use of WTRU capabilities between the two aforementioned types of RNCs.

SUMMARY

The invention provides a method of arranging WTRU capability distribution between PtP and PtM services, and describes different scenarios to coordinate establishment and distribution of WTRU PtP/PtM capabilities within a Universal Mobile Telecommunication System Terrestrial Radio Access Network (UTRAN), as an example. The invention also provides different scenarios for management of PtP/PtM services to enhance efficiencies of a communications network providing PtP and PtM services not heretofore obtainable employing conventional techniques.

PtM/PtP specific or common capabilities shared between PtM and PtP include:

To coordinate WTRU capabilities between PtM and PtP services, independent capabilities may be identified specific for each service. New PtM capabilities are added to the existing PtP capabilities. To limit the number of PtP/PtM combinations, an index can be specified to indicate certain preferred combinations of PtM and PtP capabilities.

An indicator may also be specified in WTRU capabilities if both PtM and PtP services can be received simultaneously or not. In the case where PtM and PtP cannot be received simultaneously, the PtM and PtP independent capabilities are mutually exclusive lists.

In the case of common PtM and PtP capabilities that are shared between PtP and PtM services, the S-RNC and C-RNC coordinate the distribution of capabilities between PtP and PtM services. When simultaneous support of PtP and PtM services is not indicated, the WTRU capabilities are dedicated either to the PtP or PtM service.

Exemplary procedures to coordinate establishment of PtP and PtM services and distribution of WTRU PtP/PtM capabilities within a UTRAN include:

In accordance with existing procedures, the S-RNC is informed of WTRU PtP and PtM capabilities upon establishment of a Radio Resource Control (RRC) Radio Access Network (RAN) connection. This embodiment of the invention provides mechanisms for identifying WTRU capabilities to the C-RNC that are available for PtM services. Additionally, procedures are defined for coordination of WTRU PtP and PtM capabilities between S-RNCs and C-RNCs when both services are active simultaneously and may establish or release asynchronously relative to each other.

The C-RNC is informed of either PtP/PtM common or PtM specific WTRU capabilities upon WTRU entry to any cell controlled by this C-RNC. This can be accomplished with modification to the existing cell update procedure when the WTRU does not have an active dedicated PtP service, with modification to the radio link (RL) Setup procedure when a dedicated PtP service exists, and/or with an additional new procedure initiated by the C-RNC upon activation of the PtM service.

When the WTRU does not already have an established, dedicated PtP service, each time the WTRU enters a new cell or a PtM distribution area comprising more than one cell, the WTRU will initiate the existing cell update procedure. The purpose for the existing cell update procedure is to update the WTRU location and correspondingly update UTRAN routing to establish a new transmission path to the WTRU. Upon receipt of the cell update, the S-RNC determines if the WTRU has an activated PtM service and, if so, returns the PtM WTRU capability in the cell update confirmation to the C-RNC. Alternatively, the PtM WTRU capability information is provided to the C-RNC as a separate message (i.e., service activation/PtM RB setup). In either case, it is the cell update procedure that triggers the PtM capability to be signaled to the C-RNC.

BRIEF DESCRIPTION OF THE DRAWINGS

A more detailed understanding of the invention may be had from the following description of preferred embodiments, given by way of example and to be understood in conjunction with the accompanying drawings in which like elements are designated by like numerals and wherein.

DETAILED DESCRIPTION OF THE PREFERRED EMBODIMENTS

Figure 1:
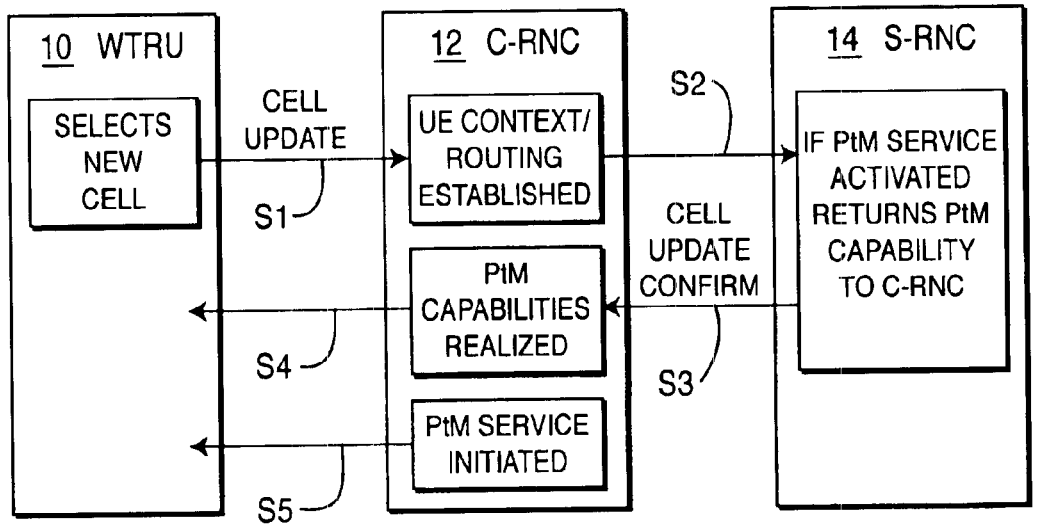
FIG. 1 illustrates a PtM WTRU capability procedure when entering a new cell, when no dedicated PtP service exists.

FIG. 1 shows an exemplary PtM WTRU capability procedure when entering a new cell, when no dedicated PtP service exists. The cell update generated by the WTRU 10, at step S1, may also be used to signal using a new cause value within the cell update message, that the initiation of the procedure is to maintain PtM service in the new cell. This indication may also identify the PtM service or services that the WTRU has activated.

The C-RNC 12, upon receipt of the cell update message, step S1, checks currently active PtM services in that cell. If a service is available in the cell for which the WTRU is activated, the C-RNC, at step S2, indicates to the S-RNC 14 the need for WTRU PtM capabilities with the cell update procedure. Alternatively, the cell update is used to just notify the S-RNC 14 that WTRU 10 has changed cells, leading to the S-RNC 14 to initiate the service. In this case, a new PtM activation message or the modification of the existing common channel resource setup procedures can be used to signal the PtM capabilities. Thus, S-RNC 14, at step S3, confirms the cell update, providing the PtM capability to C-RNC 12 which alerts WTRU 10. PtM capabilities are realized at step S4 and, at step S5, PtM service is initiated.

Figure 2:
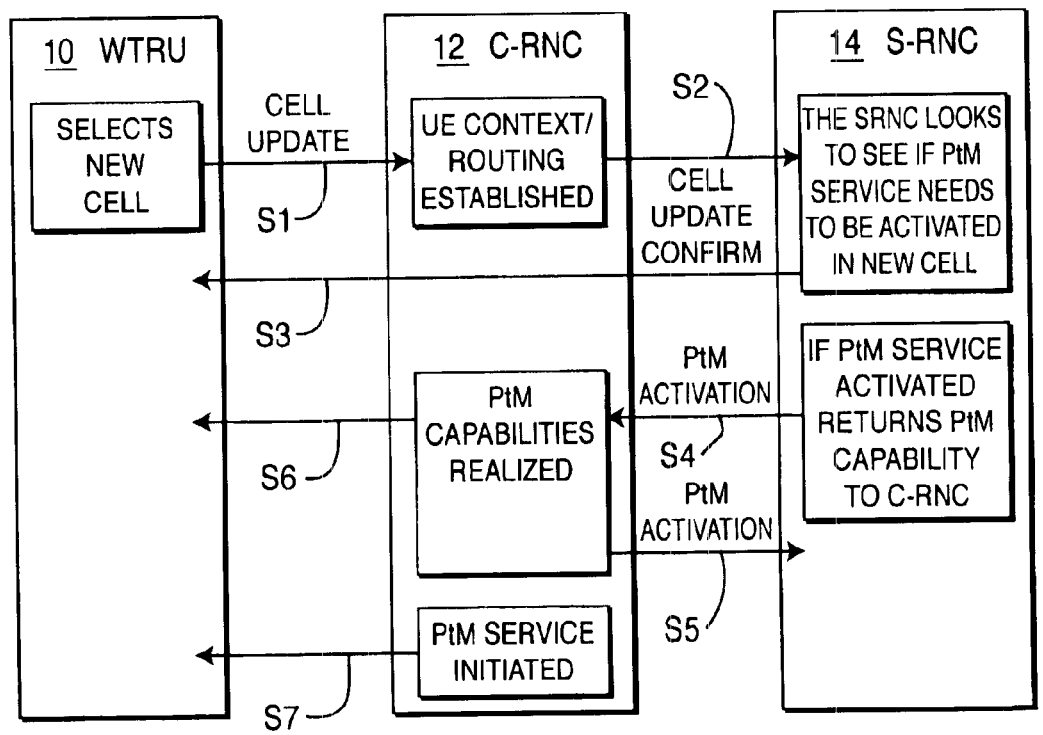
FIG. 2 illustrates a scenario similar to that in FIG. 1, but including activation by a separate procedure.

FIG. 2 generally shows an exemplary PtM WTRU capability procedure when entering a new cell, when no dedicated PtP service exists with activation by a separate procedure. When dedicated PtP services are established in a cell, upon initial establishment and each time the WTRU 10 enters a cell controlled by a different C-RNC 12, WTRU 10 initiates a cell update with C-RNC 12, at step S1. C-RNC 12 sends a cell update confirm to S-RNC 14, at step S2. S-RNC 14 generates an RL Setup procedure and, at step S3, determines if PtM service should be activated in the new cell and directly confirms the cell update with the WTRU 10. S-RNC 14, if desired, informs the C-RNC 12 of WTRU capabilities and PtP requirements. The PtM WTRU capability information could also be provided by S-RNC 14 to C-RNC 12 as a separate message (i.e., service activation/PtM RB setup or modification of the existing common channel resource setup message, at step S4). The C-RNC 12 determines the PtP physical resource assignment and associated WTRU capability requirements and confirms PtM activation to S-RNC 14 at step S5. Steps S6 and S7, performed by C-RNC 12, are similar to steps S4 and S5 of the FIG. 1 flow diagram, whereby PtM capabilities are realized at step S6, and PtM service is initiated, at step S7. In the case of common PtP/PtM capabilities, the C-RNC 12 may calculate the remaining available WTRU capabilities for PtM services without need for additional UTRAN procedures. In the case of specific PtM capabilities, the calculation is unnecessary.

Figure 3:
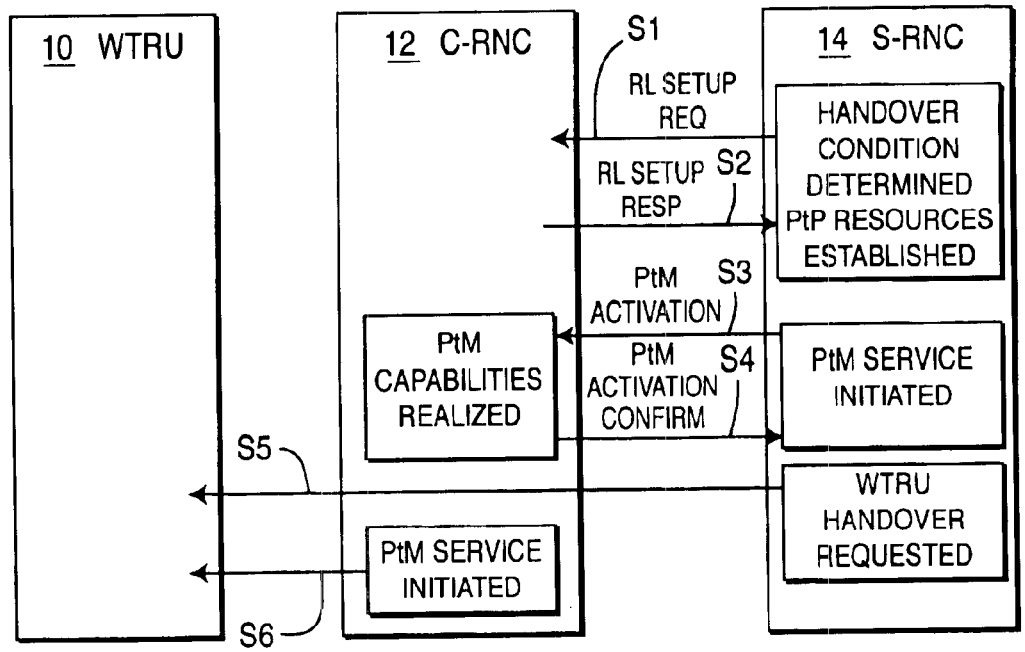
FIG. 3 is an illustration of the PtM WTRU capability procedure upon dedicated PtP establishment and handover to cells controlled by another C-RNC with a separate procedure to establish PtM service.

FIG. 3 shows an exemplary PtM WTRU capability procedure upon dedicated PtP establishment and handover to cells controlled by another C-RNC with a separate procedure to establish PtM service. As an alternative to the scenario illustrated in FIG. 2, the RL setup, initiated by S-RNC 14 at step S1 and responded to by C-RNC at step S2, may indicate PtM services that the WTRU 10 has activated. When received by the C-RNC 12, the availability of these PtM services for the cell that the WTRU has entered is verified. If a service is available in the cell for which the WTRU is activated, the C-RNC 12 indicates to the S-RNC 14 the need for WTRU PtM capabilities with, or subsequent to, the RL setup procedure. PtM activation and confirmation are performed by S-RNC 14 and C-RNC 12, at steps S3 and S4 respectively, which are respectively similar to steps S4 and S5 shown in FIG. 2. A requested handover is sent directly to WTRU 10 by S-RNC 14, at step S5. Initiation of PtM service is conveyed to WTRU 10 by C-RNC 12 at step S6.

Figure 4:
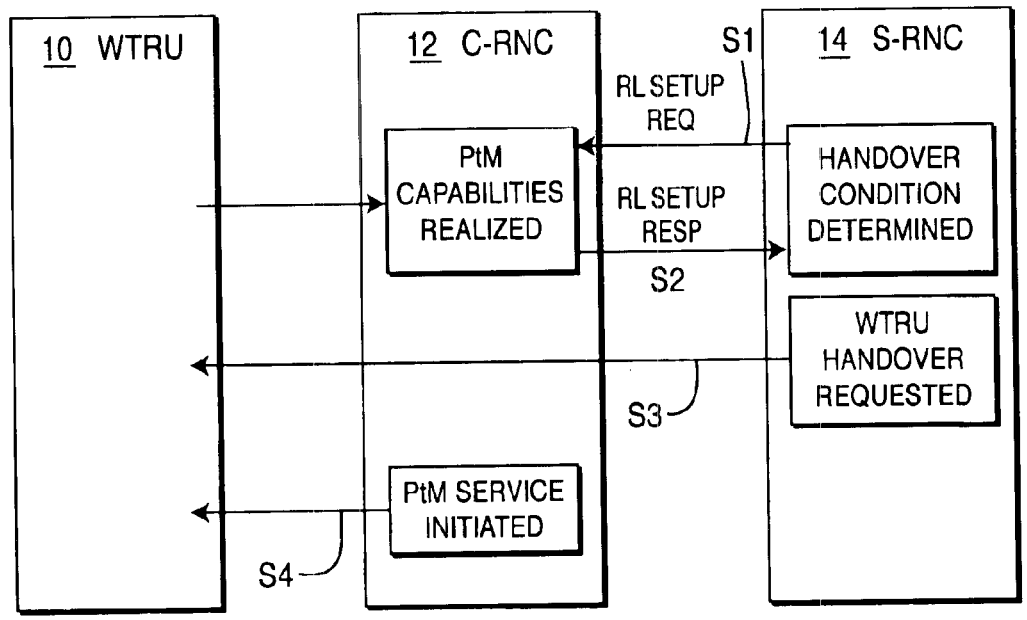
FIG. 4 is an illustration of the PtM WTRU capability upon dedicated PtP establishment and handover to cells controlled by another C-RNC with a single procedure.

FIG. 4 shows an exemplary capability procedure upon dedicated PtP establishment and handover to cells controlled by another C-RNC 12 with a single procedure. More specifically, the routine of FIG. 4 addresses the case for initial PtM service establishment.

When PtM services need to be established, the S-RNC 14, at step S1, informs the C-RNC 12 of the PtM capabilities of WTRU 10 in the service activation, to which the C-RNC 12 responds with an RL Setup response, at step S2. Alternatively, C-RNC 12 may subsequently request WTRU capabilities from S-RNC 14 in a separate procedure, not shown for purposes of simplicity. The WTRU handover request is conveyed directly to WTRU 10, at step S3. Initiation of PtM service is conveyed to WTRU 10, at step S4.

Figure 5:
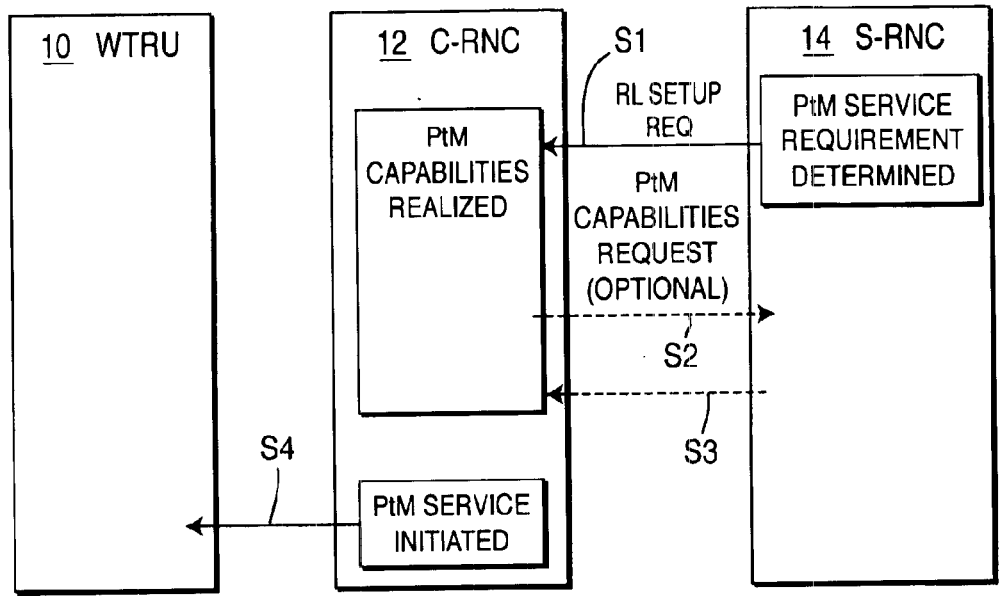
FIG. 5 is an illustration of WTRU capabilities in PtM activation with an optional subsequent capability request procedure.

FIG. 5 shows exemplary WTRU capabilities in PtM activation with an optional subsequent capability procedure at steps S2 and S3, shown in dotted fashion. More specifically, when PtP services are in progress, WTRU capabilities are known to the C-RNC 12 and available capabilities for PtM services can be determined without need for PtM capability signaling associated with, or subsequent to, PtM initiation at step S4.

When PtP services need to be established and simultaneous support of PtM/PtP services is not indicated in WTRU capabilities, either a reception of the S-RNC 14 RL Setup procedure for Call Admission Control (CAC), or an alternative UTRAN procedure in the C-RNC 12, must result in release of the PtM service. In the case of RL Setup/CAC procedure, a successful response to the S-RNC 14 must release the PtM service. This can be accomplished by modifying the existing S-RNC 14 to WTRU 10 procedure (step S1) for establishment of the PtP service with explicit signaling, requesting that the WTRU 10 should stop reception of the PtM service, or by implicit rules specifying release of the PtM service based on WTRU capability or stored configuration.

Figure 6:
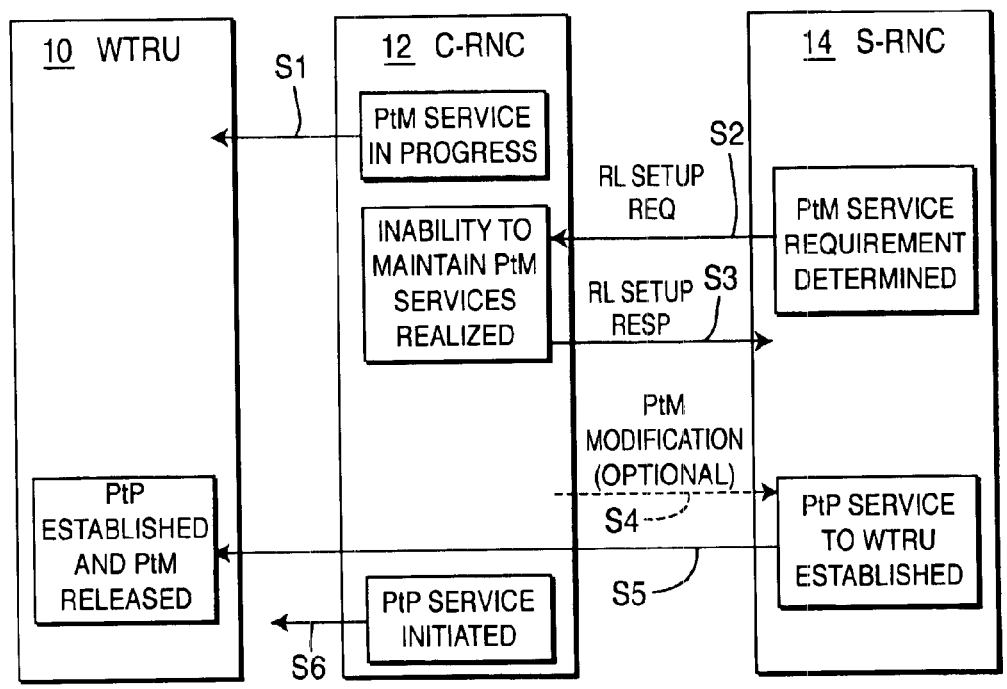
FIG. 6 shows an illustration of PtM services upon PtP establishment when WTRU capabilities do not allow for simultaneous PtP/PtM support.

FIG. 6 illustrates an example of the release of PtM services upon establishment when WTRU capabilities do not allow for simultaneous PtP/PtM support. As an alternative to the previous scenarios, the release of the PtM service maybe invoked by a new C-RNC 12 initiated procedure. A paging and notification channel is used to inform WTRU 10 of PtM service transmissions. This same channel can be used to notify the WTRU 10 of the termination of the PtM service to that WTRU or all WTRUs activated for that service, or in the newly established PtP link.

In the case of shared PtM and PtP capabilities, when PtP services need to be established, the C-RNC 12 may reduce the PtM capability requirement using a procedure similar to the PtM modification message in a manner shown in FIG. 6. More specifically, with PtM service in progress, controlled by C-RNC 12, at step S1, S-RNC 14, determining a PtP service requirement, initiates an RL setup at step S2. C-RNC 12 responds, at step S3. The PtM capability is optionally modified at step S4, shown in dotted fashion to reduce PtM service and share PtM and PtP service when the WTRU is capable of the accommodating both PtM and PtP service. S-RNC 14 initiates PtP services by notifying WTRU 10 at step S5, through a paging and notification channel, thereby establishing PtP service and releasing PtM service. C-RNC 12 initiates PtP service, at step S6.

The foregoing invention is envisaged to be applicable without limitation to time-division duplex (TDD), frequency-division duplex (FDD), code-division multiple access (CDMA) and other modes of transmission. While this invention has been particularly shown and described with reference to preferred embodiments thereof, it will be understood by those skilled in the art that various changes in form and details may be made therein without departing from the scope of the invention.

What is claimed is:

1. A method employed by a controlling radio network controller (C-RNC) and a serving RNC (S-RNC) for allocating capabilities to a wireless transmitter/receiver unit (WTRU) for point to point (PtP) and point to multipoint (PtM) services, comprising:
   said C-RNC:
   conveying communication capabilities obtained from said WTRU to said S-RNC;
   said S-RNC:
   allocating capabilities responsive to a desired service; and
   conveying the allocations to said C-RNC; wherein
   said C-RNC:
   provides PtP service to the WTRU;
   said S-RNC:
   notifies said C-RNC to activate PtM service; and
   said C-RNC:
   activates PtM service simultaneously with PtP service based upon the allocations provided by said S-RNC.

2. The method of claim 1 wherein the allocation provided by said S-RNC comprises:
   reducing the PtP capabilities to provide simultaneous PtP and PtM services.

3. The method of claim 1 wherein:
   said S-RNC:
   advises said C-RNC that no change be made in the PtP capabilities based upon WTRU capabilities which are sufficient to enable PtM service without reduction in capabilities employed for PtP service.

4. A method employed by a controlling radio network controller (C-RNC) and a serving RNC (S-RNC) for allocating capabilities to a wireless transmitter/receiver unit (WTRU) for point to point (PtP) and point to multipoint (PtM) services, comprising:
   said C-RNC:
   conveying communication capabilities obtained from said WTRU to said S-RNC;
   said S-RNC:
   allocating capabilities responsive to a desired service; and
   conveying the allocations to said C-RNC; wherein
   said C-RNC:
   provides PtP service to the WTRU;
   said S-RNC:
   notifies said C-RNC to activate PtM service; and
   said C-RNC:
   activates PtM service and terminates PtP service based upon allocations provided by said S-RNC.

5. The method of claim 4 wherein said C-RNC employs all of the capabilities of the WTRU to provide PtM services.

6. A method employed by a controlling radio network controller (C-RNC) and a serving RNC (S-RNC) for allocating capabilities to a wireless transmitter/receiver unit (WTRU) for point to point (PtP) and point to multipoint (PtM) services, comprising:
   said C-RNC:
   conveying communication capabilities obtained from said WTRU to said S-RNC;
   said S-RNC:
   allocating capabilities responsive to a desired service; and
   conveying the allocations to said C-RNC; wherein
   said C-RNC:
   provides PtP service to the WTRU:
   said S-RNC:
   notifies said C-RNC to activate PtM service; and
   said C-RNC:
   prevents PtM service simultaneously with PtP service based upon the allocations provided by said S-RNC.

7. A method for controlling point to point (PtP) and point to multipoint (PtM) services in wireless communications wherein at least one wireless transmitter/receiver unit (WTRU) is capable of communications with a plurality of cells, each cell having a controlling radio network controller (C-RNC) and a serving RNC (S-RNC) comprising;
   said WTRU:
   selecting one of said cells; and
   providing the C-RNC of said one of said cells with a cell update identifying capabilities of the WTRU;
   said C-RNC of said one cell:
   providing the cell update the S-RNC of said one cell;
   said S-RNC of said one cell:
   confirming the cell update of the WTRU to said C-RNC of said one cell; and
   upon activation of PtM service, conveying capabilities of the WTRU to be allocated for PtM service; wherein
   said S-RNC of said one cell, based upon the capabilities of the WTRU:
   instructs said C-RNC of said one cell to allocate PtP and PtM services according to the WTRU capabilities to enable PtP and PtM services to be performed simultaneously.

8. A method for controlling point to point (PtP) and point to multipoint (PtM) services in wireless communications wherein at least one wireless transmitter/receiver unit (WTRU) is capable of communications with a plurality of cells, each cell having a controlling radio network controller (C-RNC) and a serving RNC (S-RNC) comprising;

said WTRU:

selecting one of said cells; and providing the C-RNC of said one of said cells with a cell update identifying capabilities of the WTRU;

said C-RNC of said one cell:

providing the cell update the S-RNC of said one cell;

said S-RNC of said one cell:

confirming the cell update of the WTRU to said C-RNC of said one cell; and upon activation of PtM service, conveying capabilities of the WTRU to be allocated for PtM service; wherein said S-RNC of said one cell, based upon the capabilities of the WTRU:

instructs said C-RNC of said one cell to stop PtP services while said S-RNC of said one cell provides PtM services.

9. A method for establishing point to multipoint (PtM) service for at least one wireless transmitter/receiver unit (WTRU) entering a cell having a C-RNC and an S-RNC, comprising:

said WTRU:

providing a cell update to the cell;

said C-RNC:

informing said S-RNC, responsive to said WTRU's cell update; and said S-RNC:

confirming said cell update to said WTRU; wherein said WTRU providing a cell update further comprises:

providing cell transport capabilities which comprise:

providing a number of transmitted bits per frame and a number of different combinations of bits allowed.

10. A method for establishing point to multipoint (PtM) service for at least one wireless transmitter/receiver unit (WTRU) entering a cell having a C-RNC and an S-RNC, comprising:

said WTRU:

providing a cell update to the cell;

said C-RNC:

informing said S-RNC, responsive to said WTRU's cell update; and said S-RNC:

confirming said cell update to said WTRU; wherein said WTRU providing a cell update further comprises:

providing physical processing capabilities comprising:

number and types of physical channels and parameters of allowed spreading factors.

11. Apparatus for allocating capabilities for point to point (PtP) and point to multipoint (PtM) services, comprising:

a controlling radio network controller (C-RNC) comprising:

means for conveying communication capabilities obtained from a wireless transmitter/receiver unit (WTRU) to a serving RNC (S-RNC);

said S-RNC comprising:

means for allocating capabilities responsive to a desired service; and means for conveying the allocations to said C-RNC; and said C-RNC further comprises:

means for providing PtP service to the WTRU;

said S-RNC comprising:

means to notify said C-RNC to activate PtM service; and said C-RNC further comprises:

means to activate PtM service simultaneously with PtP service based upon the allocations provided by said S-RNC.

12. The apparatus of claim 11 wherein the allocation means provided by said S-RNC further comprises:

means for reducing the PtP capabilities to provide simultaneous PtP and PtM services.

13. The apparatus of claim 11 wherein said S-RNC further comprises:

means to advise said C-RNC that no change be made in the PtP capabilities based upon WTRU capabilities which are sufficient to enable PtM service without reduction in capabilities employed for PtP service.

14. Apparatus for allocating capabilities for point to point (PtP) and point to multipoint (PtM) services, comprising:

a controlling radio network controller (C-RNC) comprising:

means for conveying communication capabilities obtained from a wireless transmitter/receiver unit (WTRU) to a serving RNC (S-RNC);

said S-RNC comprising:

means for allocating capabilities responsive to a desired service; and means for conveying the allocations to said C-RNC; and said C-RNC comprises:

means to provide PtP service to the WTRU;

said S-RNC comprises:

means to notify said C-RNC to activate PtM service; and said C-RNC comprises:

means to activate PtM service and terminates PtP service based upon allocations provided by said S-RNC.

15. The apparatus of claim 14 wherein said C-RNC employs all of the capabilities of the WTRU to provide PtM services.

16. Apparatus for allocating capabilities for point to point (PtP) and point to multipoint (PtM) services, comprising:

a controlling radio network controller (C-RNC) comprising:

means for conveying communication capabilities obtained from a wireless transmitter/receiver unit (WTRU) to a serving RNC (S-RNC);

said S-RNC comprising:

means for allocating capabilities responsive to a desired service; and means for conveying the allocations to said C-RNC; wherein said C-RNC comprises:

means to provide PtP service to the WTRU:

said S-RNC comprising:

means to notify said C-RNC to activate PtM service; and said C-RNC comprises:

means to prevent PtM service simultaneously with PtP service based upon the allocations provided by said S-RNC.

17. Apparatus for allocating capabilities for point to point (PtP) and point to multipoint (PtM) services, comprising:

a controlling radio network controller (C-RNC) comprising:
: means for conveying communication capabilities obtained from a wireless transmitter/receiver unit (WTRU) to a serving RNC (S-RNC);
: said S-RNC comprising:
:: means for allocating capabilities responsive to a desired service; and
:: means for conveying the allocations to said C-RNC;

wherein
said C-RNC further comprises:
: means for providing PtP service to the WTRU;
said S-RNC comprising:
: means to notify said C-RNC to discontinue PtM service; and
: means to activate PtP service.

18. The apparatus of claim 17 wherein said means to notify said C-RNC to discontinue PtM service further comprises:
: means for requesting the WTRU to stop reception of PtM service based upon an implicit rule.

19. The apparatus of claim 17 wherein said means to notify said C-RNC to discontinue PtM service further comprises:
: means for requesting the WTRU to stop reception of PtM service based upon a WTRU capability.

20. The apparatus of claim 17 wherein said means to notify said C-RNC to discontinue PtM service further comprises:
: means for requesting the WTRU to stop reception of PtM service based upon a stored configuration of the WTRU.

21. Apparatus for controlling point to point (PtP) and point to multipoint (PtM) services in wireless communications comprising:
: a wireless transmitter/receiver unit (WTRU) comprising:
: means for selecting a new cell; and
: means for providing a controlling radio network controller (C-RNC) in the new cell with a cell update identifying capabilities of the WTRU;
: said C-RNC comprising:
:: means for providing the cell update to a serving RNC (S-RNC);
: said S-RNC comprising:
:: means for confirming the cell update of the WTRU to said C-RNC; and
:: means for conveying capabilities of the WTRU to be allocated for PtM service responsive to activation of PtM service; wherein
: said S-RNC, responsive to the capabilities of the WTRU comprises:
:: means to instruct said C-RNC to allocate the WTRU capabilities between PtP and PtM services to enable PtP and PtM services to be performed simultaneously.

22. Apparatus for controlling point to point (PtP) and point to multipoint (PtM) services in wireless communications comprising;
: a wireless transmitter/receiver unit (WTRU) comprising:
: means for selecting a new cell; and
: means for providing a controlling radio network controller (C-RNC) in the new cell with a cell update identifying capabilities of the WTRU;
: said C-RNC comprising:
:: means for providing the cell update to a serving RNC (S-RNC);
: said S-RNC comprising:
:: means for confirming the cell update of the WTRU to said C-RNC; and
:: means for conveying capabilities of the WTRU to be allocated for PtM service responsive to activation of PtM service; wherein
: said S-RNC, responsive to the capabilities of the WTRU comprises:
:: means to instruct said C-RNC to stop PtP services while said S-RNC provides PtM services.

23. Apparatus for establishing point to multipoint (PtM) service for at least one wireless transmitter/receiver unit (WTRU) entering a cell, comprising:
: said WTRU comprising:
:: means for providing a cell update in the cell;
: a controlling radio network controller (C-RNC) in the cell comprising:
:: means for informing a serving radio network controller (S-RNC) in the cell of said update, responsive to the WTRU's cell update; and
: said S-RNC comprising:
:: means for confirming said cell update to said WTRU responsive to said C-RNC; and
: said WTRU providing a cell update further comprises:
:: means providing cell transport capabilities which comprise:
::: means for providing a number of transmitted bits per frame and a number of different combinations of bits allowed.

24. Apparatus for establishing point to multipoint (PtM) service for at least one wireless transmitter/receiver unit (WTRU) entering a cell, comprising:
: said WTRU comprising:
:: means for providing a cell update in the cell;
: a controlling radio network controller (C-RNC) in the cell comprising:
:: means for informing a serving radio network controller (S-RNC) in the cell of said update, responsive to the WTRU's cell update; and
: said S-RNC comprising:
:: means for confirming said cell update to said WTRU responsive to said C-RNC; and
: said means for providing a cell update further comprises:
:: means for providing physical processing capabilities comprising:
::: means for providing number and types of physical channels and parameters of allowed spreading factors.

* * * * *